Apr. 17, 1923.  1,451,931

O. W. VALLIER

WASTE FITTING FOR SINKS

Filed Feb. 7, 1923

Inventor
Orvis W. Vallier.
By Harry D. Wallace
Attorney

Patented Apr. 17, 1923.

1,451,931

UNITED STATES PATENT OFFICE.

ORVIS W. VALLIER, OF WATERTOWN, NEW YORK, ASSIGNOR TO J. B. WISE INCORPORATED, A CORPORATION OF NEW YORK.

WASTE FITTING FOR SINKS.

Application filed February 7, 1923. Serial No. 617,499.

*To all whom it may concern:*

Be it known that I, ORVIS W. VALLIER, a citizen of the United States, residing at Watertown, in the county of Jefferson and State of New York, have invented certain new and useful Improvements in Waste Fittings for Sinks, of which the following is a specification.

This invention relates to improvements in waste-fittings for sinks and the like, and has for its object to provide a waste bushing and a detachable strainer, wherein the strainer may be readily and quickly applied to and removed from the bushing, by a simple operation that does not require any particular skill, or any special tools, and wherein the strainer consists of a plain cup-shaped part, which snaps into locking engagement with the wall of the strainer socket, for frictionally holding the strainer in place; the strainer being readily removable from its socket by simply prying it upwardly, until it is free from one or more of the retaining portions of the socket wall. A particular object is to provide strainer retaining means which are embodied in the peculiar and novel construction and arrangement of the bushing and strainer, thereby eliminating extra parts and greatly reducing the manufacturing cost.

I attain these objects by the means set forth in the detailed description which follows, and as illustrated by the accompanying drawing, in which—

Figure 1:
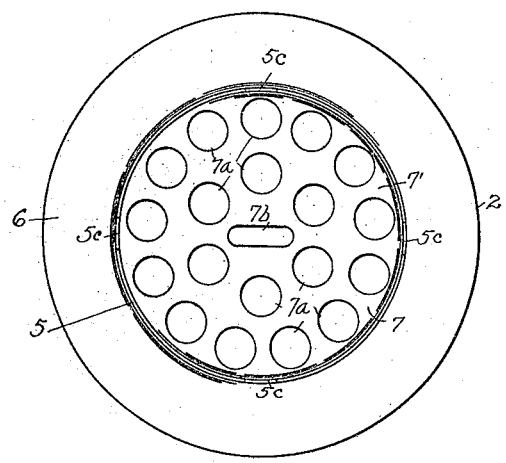
Figure 3:
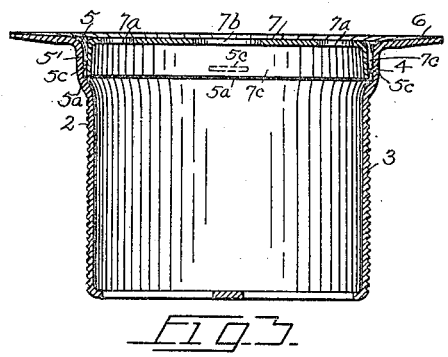
Figure 2:
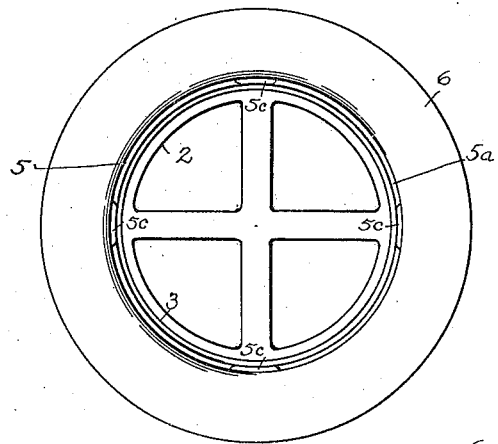
Figure 4:
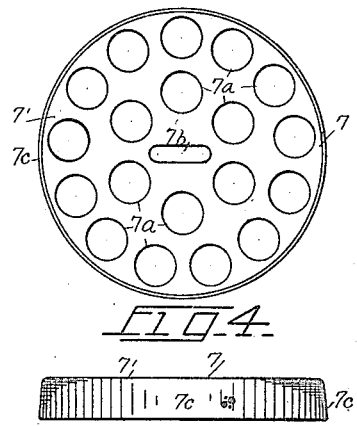
Figure 6:
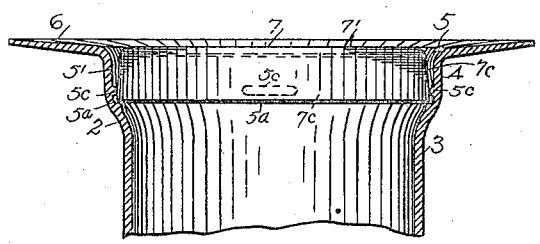

Figure 1 is a top-plan view of the waste-bushing and a strainer. Fig. 2 is a top-plan view of the waste-bushing with the strainer removed. Fig. 3 is a central vertical section; showing the means for retaining the strainer in its socket. Fig. 4 is a top-plan view of the strainer. Fig. 5 is an edge view of the same. And Fig. 6 is an enlarged central vertical section, which shows more clearly the construction and arrangement of the strainer locking means.

In the drawing, 2 represents generally the waste-bushing, having a barrel 3, which may be inserted downwardly through the usual drain-opening of a sink or like part (not shown). The barrel 3 is usually externally threaded, as shown in Fig. 3, for facilitating securing the fitting to the sink. Above the threaded portion, the barrel 3 is expanded laterally, as at 4, for providing the usual strainer socket 5, and the top-end of the said socket is surrounded by a substantially horizontal flange 6, which usually engages the top-face of the bottom of a sink. In the present showing, the flange 6 is slightly concave, and slopes in all directions towards the central opening or mouth, for facilitating the complete draining of the sink. The wall 5′ of the socket tapers slightly, as it descends, to a narrow annular horizontal shoulder or ledge 5ª, which comprises the bottom of the socket 5. At intervals around the wall 5′, the metal is drawn or punched, for providing a number of relatively narrow horizontal inwardly facing ribs or bosses 5ᶜ, there preferably being three or four of such ribs arranged in a common plane and spaced equidistantly.

7 represents the strainer, comprising a plane disc 7′, which is perforated in the usual manner, as at 7ª, for straining the water as it gravitates into the bushing 2, and the center of the said disc is formed with a slot 7ᵇ, for the insertion of any suitable prying instrument, by which the strainer may be unlocked and lifted out of the socket 5. The disc 7′ is skirted by a plain unbroken depending flange 7ᶜ, which is preferably slightly flared from top to bottom. The diameter of the base of the flange 7ᶜ is preferably somewhat less than the diameter of the socket 5 at its juncture with the ledge 5ª, and the diameter of said base is preferably slightly greater than the clear space between the several opposing ribs 5ᶜ, so that when the strainer is dropped into the socket, the outer bottom edge of the flange 7ᶜ will rest upon the tips of the ribs 5ᶜ, which prevent its further gravitation towards the ledge 5ª. To move the strainer into its operative position, shown in Figs. 3 and 6, the operator simply places his fingers upon the top face of the disc 7′, and exerts sufficient pressure to force the lower edge of the flange 7ᶜ past the ribs 5ᶜ. At the instant the lower edge of the flange slips past the tips of the ribs, the strainer snaps into the operative position (see Figs. 3 and 6), where it rests upon the ledge 5ª, and where it will be firmly held, by reason of the bevel of said flange, until it is subsequently pried loose, as described. The strainer 7 is preferably formed from relatively light gauge metal, which readily flexes inwardly in the vicinity of the ribs 5ᶜ, sufficiently to allow the free end of the flange 7ᶜ to snap into the locked position, as shown. The bushing 2, is likewise made from sheet metal of comparatively light gauge, and there is also a slight complementary outwardly yielding of the wall 5', in the neighborhood of the ribs 5ᶜ, while the strainer is being forced into the socket 5. Any suitable prying instrument may be employed like a pinch-bar, for unlocking and removing the strainer. This may be accomplished by the operator inserting one end of the instrument in the slot 7ᵇ, and then depressing the other end, which tends to tilt the forward edge of the strainer upwardly for freeing it from the adjacent rib or ribs 5ᶜ, and this latter action is facilitated by the slight upward flare of the socket wall 5'.

Having thus described my invention, what I claim, is—

1. In a waste-fitting for sinks and the like, a bushing having a circular strainer socket in its top end, the said socket being funnel-shaped, and its sloping wall being formed with a circular row of bosses, which prevent the free gravitation of the strainer towards the bottom of the socket, and an inverted cup-shaped strainer having an unbroken depending flange that flares towards its free end adapted when the strainer is subjected to downward pressure to snap beneath said bosses for holding the strainer in place.

2. In a waste-fitting for sinks and the like, a flexible sheet-metal bushing having a shallow circular socket in its top end, the upright wall of said socket being formed with inwardly projecting ribs, a circular strainer having a flexible depending flange of less diameter than said socket, the free end of said flange being greater in diameter than the body of the strainer adapted to snap beneath said ribs when the strainer is forced downwardly in said socket by the opposite lateral flexing of said flange and the wall of said socket, and the said strainer adapted to be tilted by the use of a prying tool for releasing its flange from said ribs.

3. In a waste-fitting for sinks and the like, the combination of a bushing having a circular strainer socket in its top end, the upright wall of said socket being bevelled and terminating at a horizontal ledge, the said wall being punched inwardly radially for providing equidistantly spaced ribs disposed above and parallel to said ledge, a disc strainer having a depending annular flange which flares toward its free end, the diameter of the free end of said flange being greater than the clear space between the tips of said ribs and being of less diameter than said socket, the free end of said flange adapted to snap beneath said ribs when the strainer is forced downwardly by the complementary flexing of said flange and the wall of said socket.

4. In a waste-fitting for sinks and the like, the combination of a flexible sheet-metal bushing, and an inverted cup-shaped sheet metal strainer, the top-end of the bushing being formed with a circular socket for loosely receiving the strainer, the upright wall of said socket being tapered and its inner surface being interrupted by a plurality of radial inwardly projecting ribs arranged in a horizontal row, the flange of said strainer being flared towards its free end, and the said end adapted to encounter said ribs when the strainer is inserted in said socket, and the said flange adapted to flex inwardly radially for effecting the snapping of its free end beneath said ribs, when the strainer is forced downwardly into the bushing.

5. In a waste-fitting for sinks and the like, a bushing having a flange at its top end and an internal horizontal ledge below said flange, the space between said flange and said ledge comprising a circular strainer socket, the wall of said socket contracting towards said ledge and being formed with a number of radial inwardly facing ribs arranged in a horizontal row parallel to the said ledge, and a circular strainer adapted to be inserted in said socket, said strainer comprising a flat perforated disc having a depending annular flaring flange, the said strainer being of less diameter than said socket, but of greater diameter than the clear space between the tips of said ribs, adapted when forced downwardly to snap beneath the said ribs for holding the strainer from accidental displacement.

6. A waste fitting for sinks and the like comprising a bushing having a cylindrical portion adapted to extend through the drain opening of a sink, the top end of said cylindrical portion being formed with a lateral flange, and the said portion immediately below said flange being enlarged laterally for providing a strainer socket whose wall tapers towards a horizontal ledge and is formed with inwardly facing ribs arranged in a common plane parallel to said ledge, and a strainer of smaller diameter than said socket comprising a plane perforated disc and an unbroken depending flange, said flange flaring outwardly towards its free end and having a diameter at said end greater than the space between the several opposing ribs adapted to snap beneath said ribs and to come to rest upon said ledge, when the strainer is forced downwardly into said socket, for locking and holding the strainer in place.

In testimony whereof I affix my signature.

ORVIS W. VALLIER.